US011388219B2

(12) United States Patent
Leem

(10) Patent No.: US 11,388,219 B2
(45) Date of Patent: Jul. 12, 2022

(54) INTERACTIVE DATA TRANSFER

(71) Applicant: INTERNATIONAL BUSINESS MACHINES CORPORATION, Armonk, NY (US)

(72) Inventor: Jin Leem, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 310 days.

(21) Appl. No.: 16/391,368

(22) Filed: Apr. 23, 2019

(65) Prior Publication Data

US 2020/0344288 A1 Oct. 29, 2020

(51) Int. Cl.
*H04L 67/06* (2022.01)
*G06F 3/0486* (2013.01)
*G06F 21/62* (2013.01)
*H04L 67/75* (2022.01)

(52) U.S. Cl.
CPC ............ *H04L 67/06* (2013.01); *G06F 3/0486* (2013.01); *G06F 21/6254* (2013.01); *H04L 67/75* (2022.05)

(58) Field of Classification Search
CPC ....... H04L 67/06; H04L 67/36; G06F 3/0486; G06F 21/6254; G09G 5/30
See application file for complete search history.

(56) References Cited

U.S. PATENT DOCUMENTS

| 5,822,532 | A | 10/1998 | Ikeda | |
|---|---|---|---|---|
| 7,191,183 | B1 | 3/2007 | Goldstein | |
| 7,546,354 | B1* | 6/2009 | Fan | G06F 11/2025 709/219 |
| 8,015,235 | B1* | 9/2011 | Bauer | G06F 9/5061 709/201 |
| 8,321,781 | B2* | 11/2012 | Tolle | G06F 16/904 715/227 |
| 9,805,694 | B2 | 10/2017 | Farchmin et al. | |
| 2004/0225955 | A1* | 11/2004 | Ly | G06Q 10/06 715/273 |
| 2005/0131923 | A1* | 6/2005 | Noguchi | H04L 67/75 |
| 2005/0289235 | A1* | 12/2005 | Suematsu | H04L 67/06 709/230 |
| 2010/0218131 | A1* | 8/2010 | Holm-Petersen | G06Q 10/087 715/771 |

(Continued)

OTHER PUBLICATIONS

Atachiants, "Supporting Visual Diagnosis of Performance Problems in Multi-Core and Parallel Software", Sep. 29, 2015, pp. 1-205.

(Continued)

*Primary Examiner* — William G Trost, IV
*Assistant Examiner* — Adam A Cooney
(74) *Attorney, Agent, or Firm* — L. Jeffrey Kelly

(57) ABSTRACT

An embodiment of the invention may include a method, computer program product and computer system for interactive data transfer which may include a computing device which may receive a search request for data from a first node and search a plurality of secondary nodes for the requested data. The computing device may receive the requested data from one or more of the plurality of secondary nodes and generate a data visualization chart for the requested data. The computing device may display the data visualization chart to a user at the first node. The computing device may modify the data visualization chart based on a received request to transfer a portion of the received data.

12 Claims, 11 Drawing Sheets

(56) References Cited

U.S. PATENT DOCUMENTS

| | | | | |
|---|---|---|---|---|
| 2012/0117458 | A1* | 5/2012 | Holloway | H04L 61/2007 715/234 |
| 2015/0007085 | A1* | 1/2015 | Abeln | G06Q 10/06 715/771 |
| 2016/0117371 | A1* | 4/2016 | Couris | G06F 16/282 707/602 |
| 2016/0321224 | A1* | 11/2016 | Duncker | G06T 11/206 |
| 2017/0139724 | A1* | 5/2017 | Rider | G06F 8/34 |
| 2019/0199829 | A1* | 6/2019 | Chan | H04L 67/04 |
| 2020/0097676 | A1* | 3/2020 | Margel | G06F 21/316 |
| 2020/0310666 | A1* | 10/2020 | Yang | G06F 3/067 |

OTHER PUBLICATIONS

Biehler, "Cognitive Technologies for Statistics Education; Relating the Perspective of Tools for Learning and of Tools for Doing Statistics", From Bunelli, Lina & Cicchitelli, Guiseppe (editors). Proceedings of the First Scientific Meeting (of the IASE), Universita di Perugia, Italy, 1994, pp. 173-190.

Jern, "Smart Documents for Web-Enabled Collaboration", Springer-Verlag London, 2001, https://link.springer.com/chapter/10.1007/978-M471-0293-9_12, 1-26 pages.

Lee et al., "A Phrase-Driven Grammar Systems for Interactive Data Visualization", SPIEDigitalLibrary.org/conference-proceedings-of-spie, Proc. SPIE 6809 Visualization and Data Analysis 2008, pp. 1-13.

Taher et al., "Exploring Interactions with Physically Dynamic Bar Charts", Proceedings of the SIGCHI Conference on Human Factors in Computing Systems, Apr. 2015, pp. 3237-3246.

Thaller, "Historical Software Issue 12: Statistical Package for the Social Sciences/SPSS X", 1984, http://nbn-resolving.org/urn:nbn:de:0168-ssoar-52123, pp. 96-104.

Solem, "Computer Graphics for Management", An abstiact of Capabilities and Applications of the EIS System, Boeing Computer Services, Inc.,1975,https://ntrs.nasa.gov/search.jsp?R=19760009746 2018-11-25T22:25:48+00:00Z, printed Nov. 25, 2018, pp. 427-446.

Mell et al., "The NIST Definition of Cloud Computing", National Institute of Standards and Technology, Special Publication 800-145, Sep. 2011, pp. 1-7.

* cited by examiner

INTERACTIVE DATA TRANSFER

BACKGROUND

The present invention relates generally to a method, system, and computer program for interactive data transfer. More particularly, the present invention relates to a method, system, and computer program for transferring data between nodes using an interactive data transfer visualization chart.

Data transfer is the process of using computing techniques and technologies to transmit or transfer electronic or analog data from one computer node to another. Data is transferred in the form of bits and bytes over a digital or analog medium, and the process enables digital or analog communications and its movement between devices. Data transfer utilizes various communication medium formats to move data between one or more nodes. Transferred data may be of any type, size and nature. Analog data transfer typically sends data in the form of analog signals, while digital data transfer converts data into digital bit streams. For example, data transfer from a remote server to a local computer is a type of digital data transfer. Moreover, data transfer also may be accomplished through the use of network-less environments/modes, such as copying data to an external device and then copying from that device to another.

BRIEF SUMMARY

An embodiment of the invention may include a method, computer program product and computer system for interactive data transfer. The method, computer program product and computer system may include a computing device which may receive a search request for data from a computing device at a first node and search a plurality of secondary nodes for the requested data. The computing device may receive the requested data from one or more of the plurality of secondary nodes and generate a data visualization chart for the requested data. The computing device may display the data visualization chart to a user at the first node. The computing device may receive a request from the user to transfer a portion of data from an origination node to another node and modify the data visualization chart to display how the portion of data to be transferred would affect each node. The computing device may receive a destination node selection from the user, the destination node being selected to receive the portion of data from the origination node and transfer the portion of data from the origination node to the destination node. The computing device may update the data visualization chart based on the data transfer.

BRIEF DESCRIPTION OF THE DRAWINGS

FIG. 1b illustrates example operating modules of the interactive data transfer program of FIG. 1a.

FIG. 1c illustrates an example user interface of the interactive data transfer program of FIG. 1a.

FIG. 1d illustrates an example user interface of the interactive data transfer program of FIG. 1a.

FIG. 1e illustrates an example user interface of the interactive data transfer program of FIG. 1a.

FIG. 1f illustrates an example user interface of the interactive data transfer program of FIG. 1a.

FIG. 1g illustrates an example user interface of the interactive data transfer program of FIG. 1a.

FIG. 1h illustrates an example user interface of the interactive data transfer program of FIG. 1a.

FIG. 1i illustrates an example user interface of the interactive data transfer program of FIG. 1a.

FIG. 1j illustrates an example user interface of the interactive data transfer program of FIG. 1a.

DETAILED DESCRIPTION

Figure 1A:
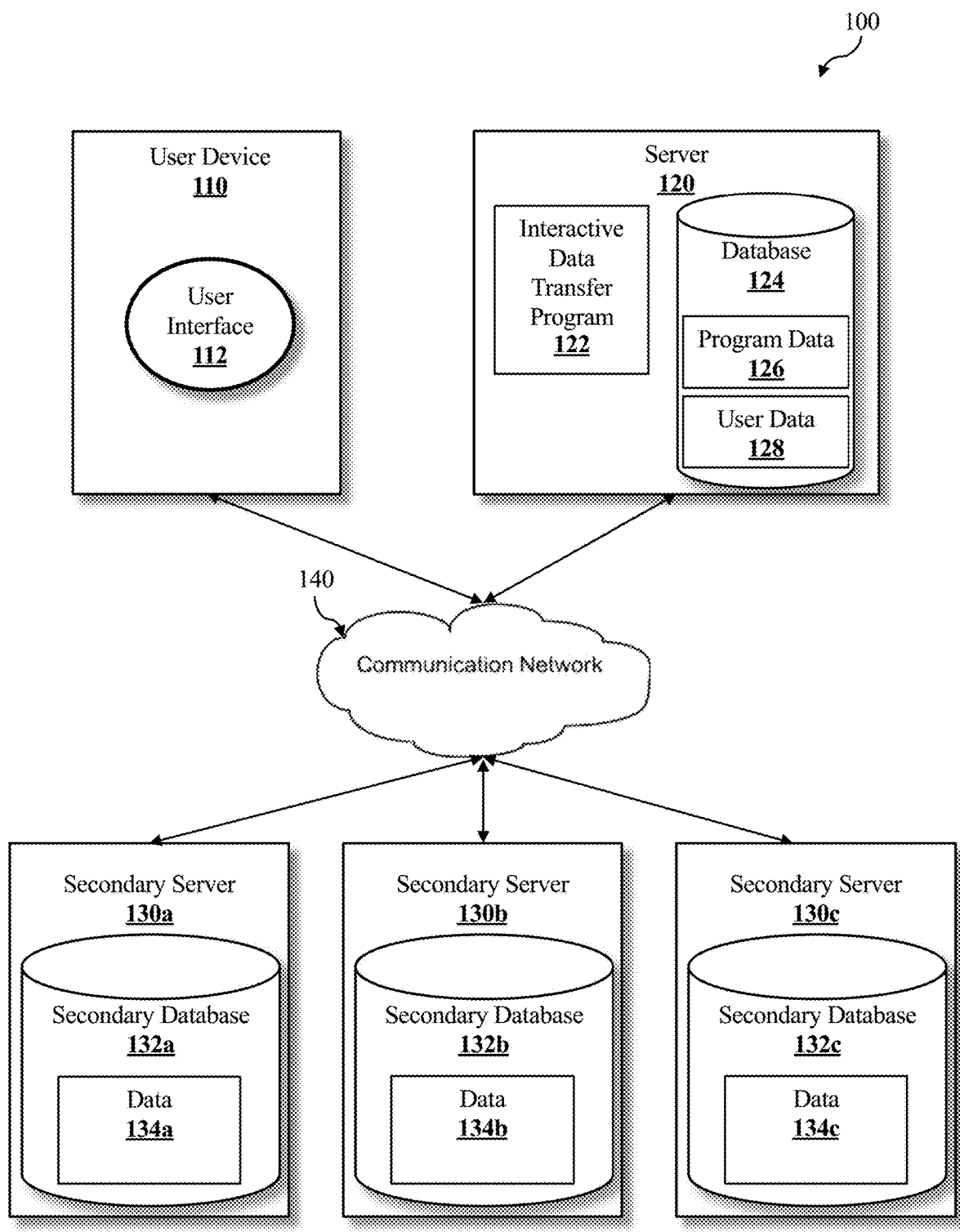
FIG. 1a illustrates a system for interactive data transfer, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provides a method, computer program, and computer system for transferring data between nodes using an interactive data transfer visualization chart. Current technology only allows for a user to visualize the data available in searched nodes, i.e. the user has no information regarding how many other nodes are available and what value/quantity of data they are holding. Thus, current technology makes it hard for a user to make a data transfer decision because the user cannot see the whole picture, i.e. the user cannot compare multiple nodes containing data and the value/quantity of data they are holding. Embodiments of the present invention enable a user to see the storage availability of each node in one clear visual, allowing the user to compare the value/quantity of data and data storage available between many nodes is in one view. Embodiments of the present invention allow for the user to interactively transfer data between nodes. For example, embodiments of the present invention allow a user to select a data value/quantity and transfer that selected data value/quantity via a simple drag and drop interaction.

Reference will now be made in detail to the embodiments of the present invention, examples of which are illustrated in the accompanying drawings, wherein like reference numerals refer to like elements throughout. Embodiments of the invention are generally directed to a system for transferring data between nodes using an interactive data transfer visualization chart.

FIG. 1a illustrates an interactive data transfer system 100, in accordance with an embodiment of the invention. In an example embodiment, the interactive data transfer system 100 includes a user device 110, a server 120, and secondary servers 130a-c, interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the user device 110, the server 120, and the secondary servers 130a, 130b, 130c.

The user device 110 may include a user interface 112. In the example embodiment, the user device 110 may be a desktop computer, a notebook, a laptop computer, a tablet computer, a thin client, or any other electronic device or computing system capable of storing compiling and organizing audio, visual, or textual content and receiving and sending that content to and from other computing devices, such as the server 120, and the secondary servers 130a, 130b, 130c via the network 140. While only a single user device 110 is depicted, it can be appreciated that any number of user devices may be part of the interactive data transfer system 100. In some embodiments, the user device 110 includes a collection of devices or data sources. The user device 110 is described in more detail with reference to FIG. 3.

The user interface 112 includes components used to receive input from a user on the user device 110 and transmit the input to an interactive data transfer system program 122 residing on the server 120, or conversely to receive information from the interactive data transfer system program 122 and display the information to the user on the user device 110. In an example embodiment, the user interface 112 uses a combination of technologies and devices, such as device drivers, to provide a platform to enable users of the user device 110 to interact with the profile picture selection program 122. In the example embodiment, the user interface 112 receives input, such as but not limited to, textual, visual, or audio input received from a physical input device, such as but not limited to, a keypad, mouse, and/or a microphone. Example embodiments of the user interface 112 are illustrated in FIGS. 1c-1j and will be described in further detail below with reference to FIGS. 1b-1j.

The server 120 includes interactive data transfer program 122 and database 124. In the example embodiment, the server 120 may be a desktop computer, a notebook, a laptop computer, a tablet computer, a thin client, or any other electronic device or computing system capable of storing compiling and organizing audio, visual, and/or textual data and receiving and sending that data to and from other computing devices, such as the user device 110 and the secondary servers 130a, 130b, 130c via network 140. While the server 120 is depicted as separate from the user device 110, it can be appreciated that the server 120 and the user device 110 may be the same device. The server 120 is described in more detail with reference to FIG. 3.

The interactive data transfer program 122 is a program capable of analyzing data across one or more nodes and displaying the data stored on the one or more nodes. Further, the interactive data transfer program 122 may enable the transfer of the data between nodes using an interactive data transfer visualization chart. The interactive data transfer program 122 is described in more detail below with reference to FIG. 1b.

The program database 124 may store program data 126 and user data 128. The program data 126 may include, but is not limited to data 134a, 134b, 134c obtained from the secondary servers 130a, 130b, 130c by the profile picture selection program 122 and data created by the profile picture selection program 122 such as, but not limited to, bar graphs. The user data 128 may include, but is not limited to, user identification data, user preferences, and user history, etc. associated with one or more users of the interactive data transfer program 122. The database 124 is described in more detail above and with reference to FIG. 3.

The secondary servers 130a, 130b, 130c may include secondary databases 132a, 132b, 132c and user data 134a, 134b, 134c. While three secondary servers 130a, 130b, 130c are illustrated, it can be appreciated that any number of secondary servers 130 may be part of the interactive data transfer system 100 including less than three or more than three depending on the system. In the example embodiment, the secondary servers 130a, 130b, 130c may be a desktop computer, a notebook, a laptop computer, a tablet computer, a thin client, or any other electronic device or computing system capable of storing compiling and organizing data and receiving and sending that data to and from other computing devices, such as the user device 110, and the server 120 via the network 140. In some embodiments, the secondary servers 130a, 130b, 130c may include a collection of devices or data sources. The secondary servers 130a, 130b, 130c are described in more detail with reference to FIG. 3.

The secondary databases 132a, 132b, 132c may be a collection of the data 134a, 134b, 134c. The secondary databases 132a, 132b, 132c may also be referred to herein as "nodes." The data 134a, 134b, 134c may be, but is not limited to, audio, visual, and/or textual data. For example, the data 134a, 134b, 134c may include, but is not limited to, inventory data, supply data, financial account data, and/or any quantitative data, etc. For example, in a retail environment, the secondary servers 130a, 130b, 130c (or nodes), may correspond to, but are not limited to, different retail stores, warehouses, and/or distribution centers, etc. and the data 134a, 134b, 134c may be retail inventory data such as, but not limited to, products, product numbers, e.g. stock keeping units (skus), locations of products, product amounts at each location, etc. In another example, the interactive data transfer system 100 may be utilized in a financial environment and the secondary servers 130a, 130b, 130c, may correspond to different financial accounts such as, but not limited to, a checking account, a savings account, an investment account, etc. and the data 134a, 134b, 134c may be financial account data such as, but not limited to, financial institution information, account number, account balance, available account balance, available credit balance, etc. In embodiments of the invention, the data 134a, 134b, 134c may be, but is not limited to, private data, public data, and/or hybrid data, etc. The data 134a, 134b, 134c stored in secondary databases 132*a*, 132*b*, 132*c* located on the secondary servers 130*a*, 130*b*, 130*c* may be accessed through the network 140.

Figure 1B:
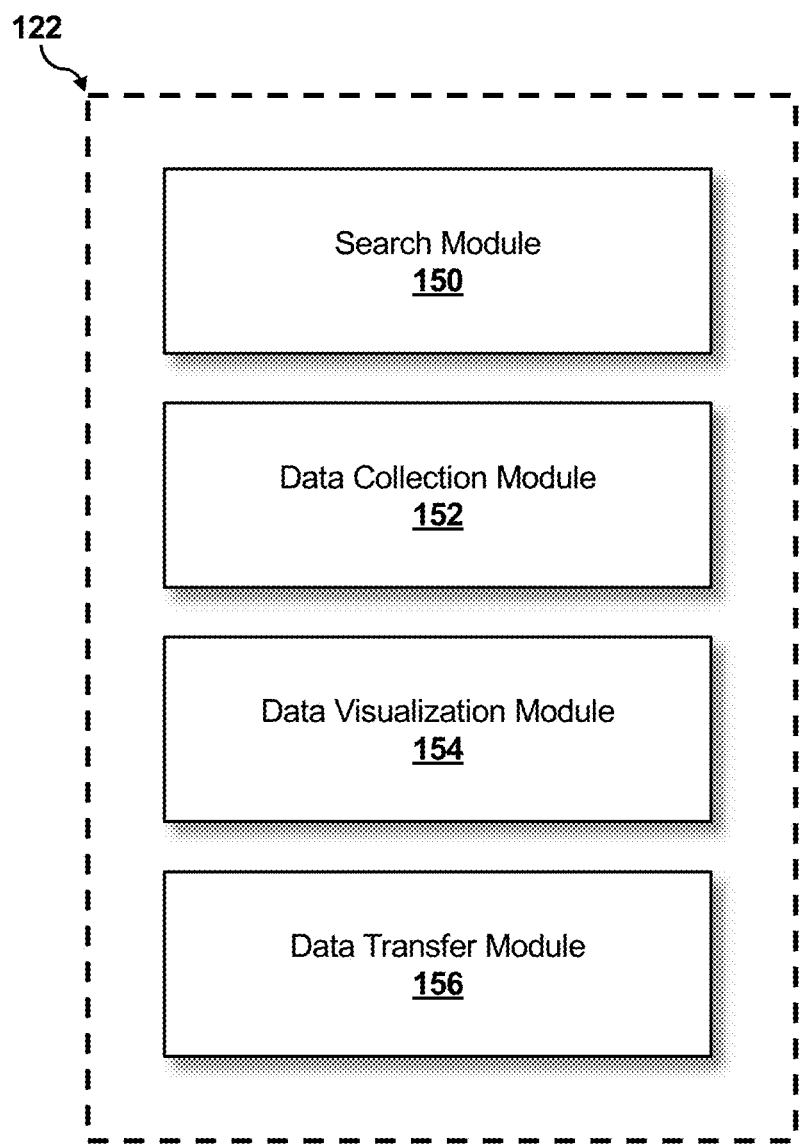

FIG. 1*b* illustrates example modules of the interactive data transfer program 122. In an example embodiment, the interactive data transfer program 122 may include four modules: search module 150, data collection module 152, data visualization module 154, and data transfer module 156.

The search module 150 receives a search request for data from a first node, i.e., the user device 110, via the user interface 112. The search request may be a request for the data 134*a*, 134*b*, 134*c* or a subset of the data 134*a*, 134*b*, 134*c* stored at a plurality of secondary nodes, e.g. the server 120 and/or the secondary servers 130*a*, 130*b*, 130*c*. For example, the search request may be for an inventory of a particular product at a plurality of locations, each of the plurality of locations having a secondary server 130 storing the inventory data for that locations, i.e., the plurality of secondary nodes. The search module 150 searches the plurality of secondary nodes, e.g. the server 120 and/or the secondary servers 130*a*, 130*b*, 130*c* for the requested data. For example, the search module 150 may search all the locations that may store the product being searched.

The data collection module 152 receives the requested data, e.g. the data 134*a*, 134*b*, 134*c* or a subset of the data 134*a*, 134*b*, 134*c* from the plurality of secondary nodes, e.g. the server 120 and/or the secondary servers 130*a*, 130*b*, 130*c*. The requested data may contain private data and the data collection module 152 may anonymize the requested data. The data collection module 152 may anonymize and/or pseudonymize the requested data by either encrypting the private data contained within the requested data and/or by removing certain identifying information from the private data. Data anonymize and/or pseudonymize may be accomplished using any known encryption, anonymization and/or pseudonymization techniques. The data collection module 152 may store the requested data on the program database 124 as part of the program data 126.

Figure 1C:
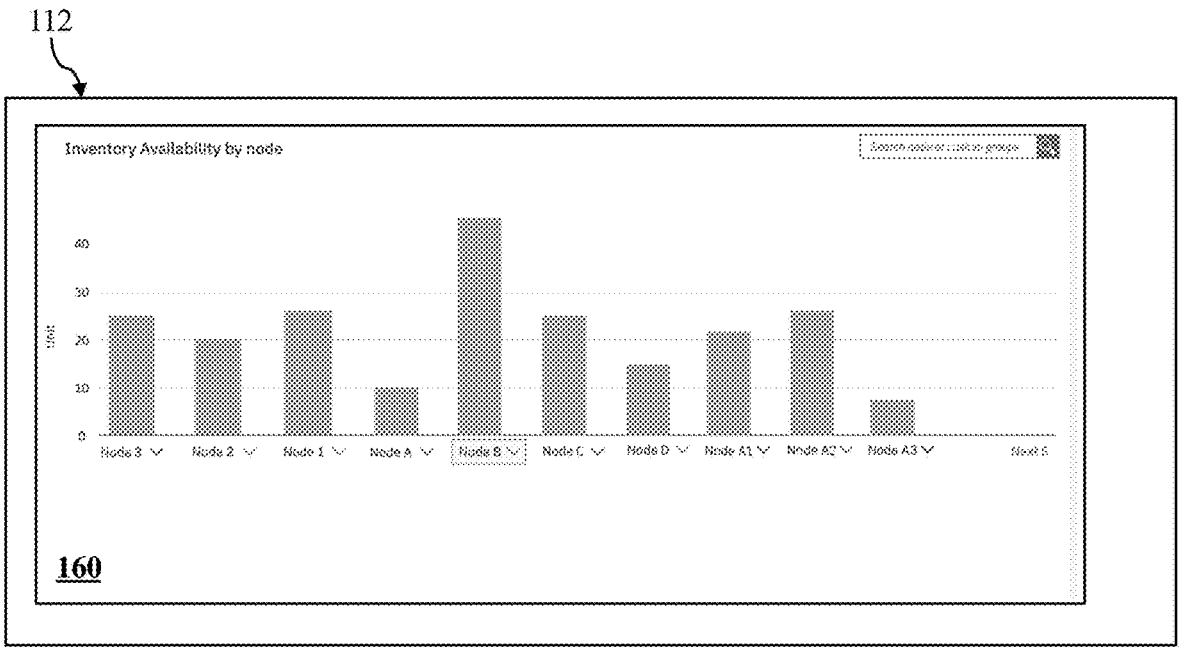

The data visualization module 154 generates a data visualization chart 160 for the requested data. The data visualization chart 160 may be displayed on the first node, i.e. the user device 110, as part of the user interface 112. Further, the data visualization chart 160 may be interactive. The data visualization chart 160 may be, but is not limited to, a bar chart, a pie chart, or any chart capable of visually representing the requested data. Referring to FIG. 1*c*, if the requested data is the inventory of a certain product at a plurality of locations, the data visualization chart 160 may be a bar chart in which the x-axis represents the various locations, i.e. nodes, and the y-axis represents the quantity of the product located at the locations.

Figure 1D:
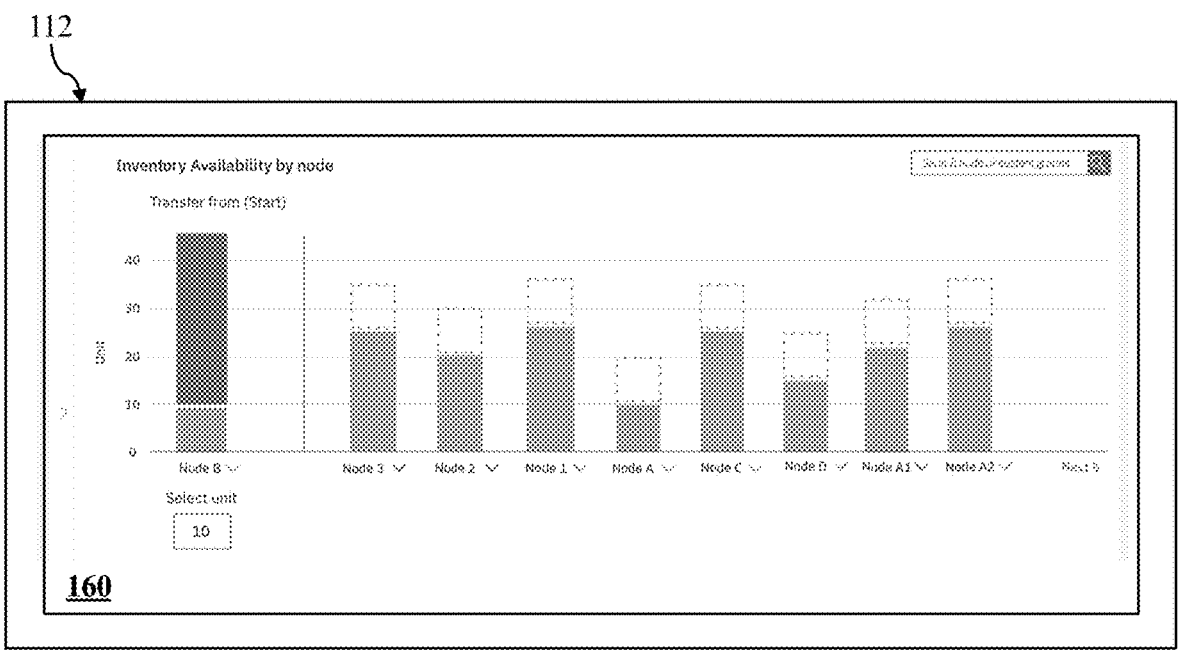
Figure 1E:
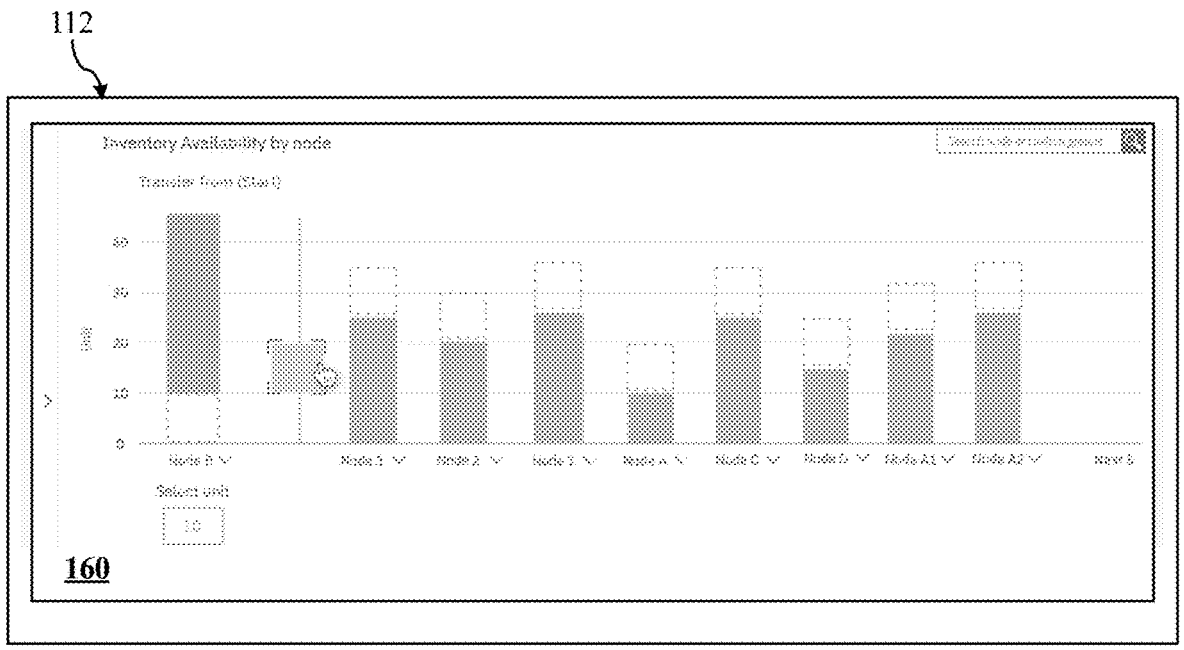
Figure 1F:
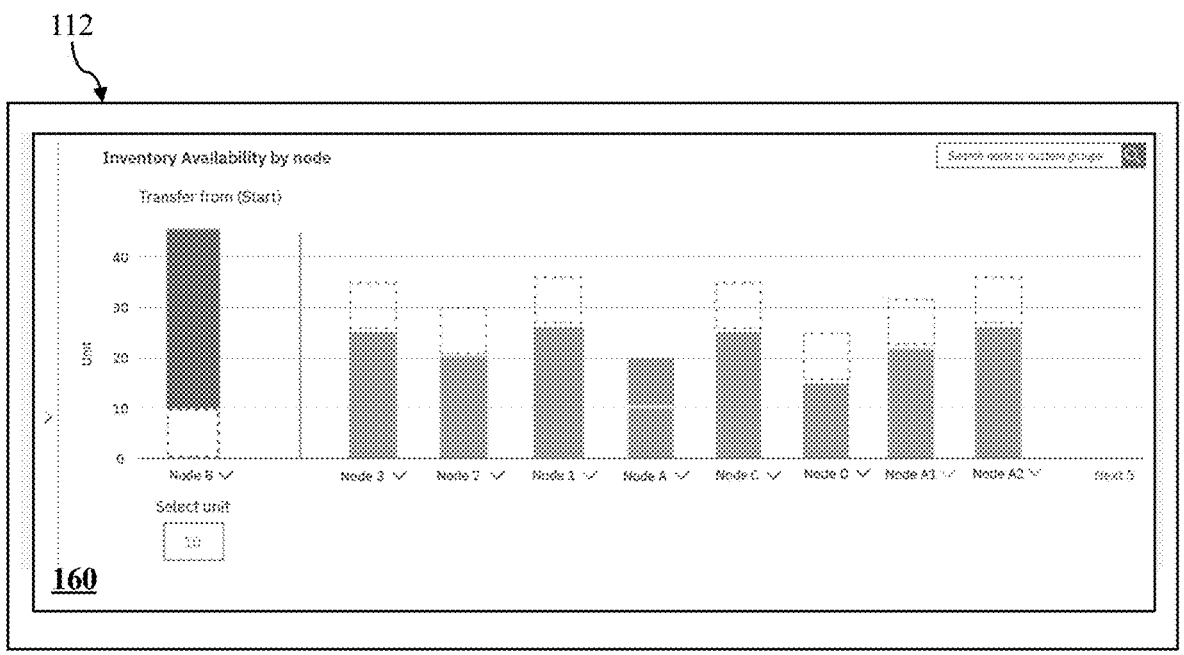
Figure 1G:
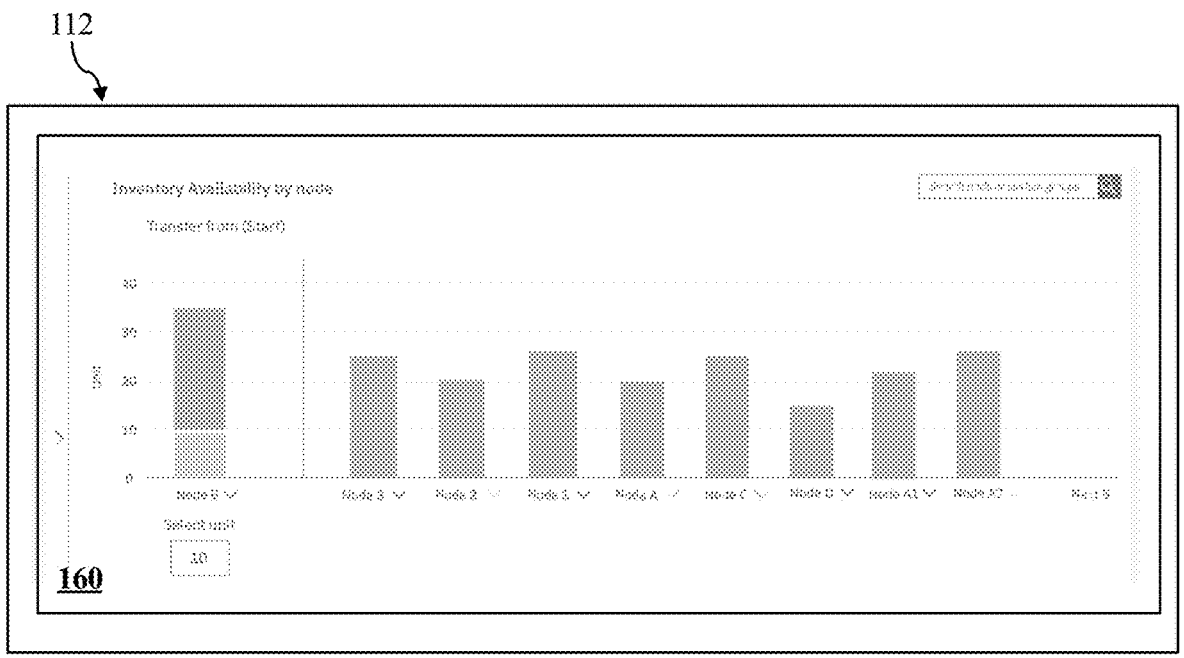
Figure 1H:
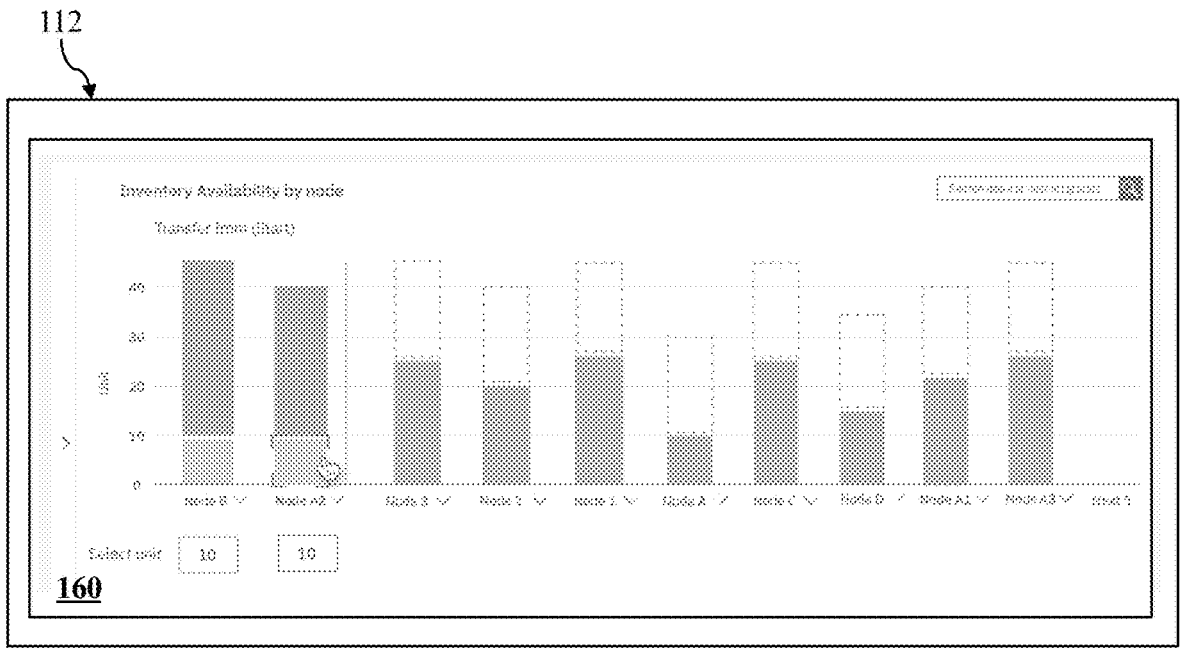

The data transfer module 156 receives a request to transfer a portion of the requested data located from an origination node, e.g. secondary server 130*a*, to another node, e.g. secondary server 130*b*, 130*c*, and/or server 120. The portion of data to be transferred may be for example, but not limited to, a default portion and/or selected by a user on the user device 110. The data transfer module 156 modifies the data visualization chart 160 to display how the portion of data requested to be transferred from the origination node would affect each of the remaining nodes. For example, the data transfer module 156 may illustrate how the transfer of ten products from a first location would affect the inventory of that product at the remaining locations if the ten products were transferred to those locations. An example of modification of the data visualization chart 160 to display how the portion of data requested to be transferred from the origination node would affect each of the remaining nodes is illustrated in FIG. 1*d*. Referring to FIG. 1*d*, the data visualization chart 160 has been modified from FIG. 1*c* to illustrate that the origination node is "Node B" which contains 45 units and the portion of data to be transferred is "10 units" illustrated as a lighter box. The data transfer module 156 illustrates how the "10 units" from "Node B" would affect the remaining nodes as illustrated by the hashed boxes with each hashed box representing the "10 units" that would be transferred from "Node B". While transferring a portion of data from an origination node to another node is described above and illustrated, it can be appreciated that in another embodiment, a request may be made to transfer a certain portion of data to a destination node and the interactive data transfer program 122 may illustrate how the remaining nodes would be affected if the portion of data were to be transferred from those remaining nodes to the destination node. In another embodiment, as illustrated in FIG. 1*h*, the data transfer module 156 may receive a request to transfer a portion of the requested data located from more than one origination node, e.g. secondary server 130*a*, to another node, e.g. secondary server 130*b*, 130*c*, and/or server 120.

Figure 1I:
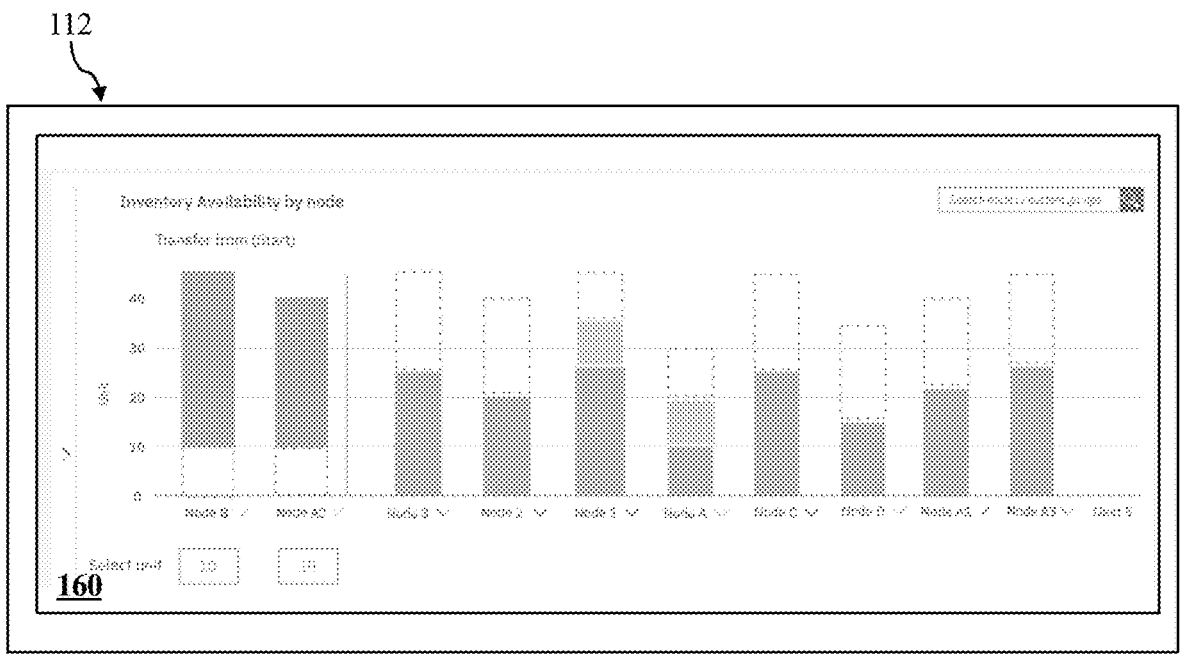
Figure 1J:

The data transfer module 156 receives a destination node selection to receive the portion of data from the origination node. The destination node may be any one of the secondary nodes, e.g. secondary server 130*b*, 130*c*, and/or server 120. The destination node selection may be selected interactively on the data visualization chart 160 by a user on the user device 110 via the user interface 112. For example, as illustrated in FIG. 1*e*-1*f*, the portion of data illustrated on the data visualization chart 160 to be transferred from the origination node may be selected, e.g. by clicking using a cursor, by a user on the user interface 112 and dragged to any one of the secondary nodes, e.g. secondary server 130*b*, 130*c*, and/or server 120. Thus, the transfer of the portion of data from the origination node may be visualized on the user interface 112. In another embodiment, the data transfer module 156 may receive more than one destination node selection to receive the portion of data from the origination node. The data transfer module 156 transfers the portion of data from the origination node to the selected destination node and updates the data visualization chart 160 to reflect the data transfer as illustrated in FIG. 1*g*. Referring to FIG. 1*g* the portion of data, e.g. the "10 units", has been transferred to "Node A" and the "Node B" has been updated to reflect the transfer of the "10 units". In embodiments of the invention, the transfer of the portion of data may, for example, but not limited to, represent a physical transfer of the items represented by the portion of data. For example, if the data 134*a*, 134*b*, 134*c*, to be transferred represents money, the data transfer module 156 may cause the money to be transferred from the origination node, e.g. a checking account, to the selected destination node, e.g. a savings account. In a further example, if the data 134*a*, 134*b*, 134*c* to be transferred is clothing inventory, the data transfer module 156 may generate a transfer order for the clothing to be transferred from the origination node, e.g. a distribution center, to the selected destination node, e.g. a retail location. In another embodiment, as illustrated in FIGS. 1*i*-1*j*, the data transfer module 156 may transfer the portion of data from the origination node to a plurality of selected destination nodes and update the data visualization chart 160 to reflect the data transfer.

Figure 2:
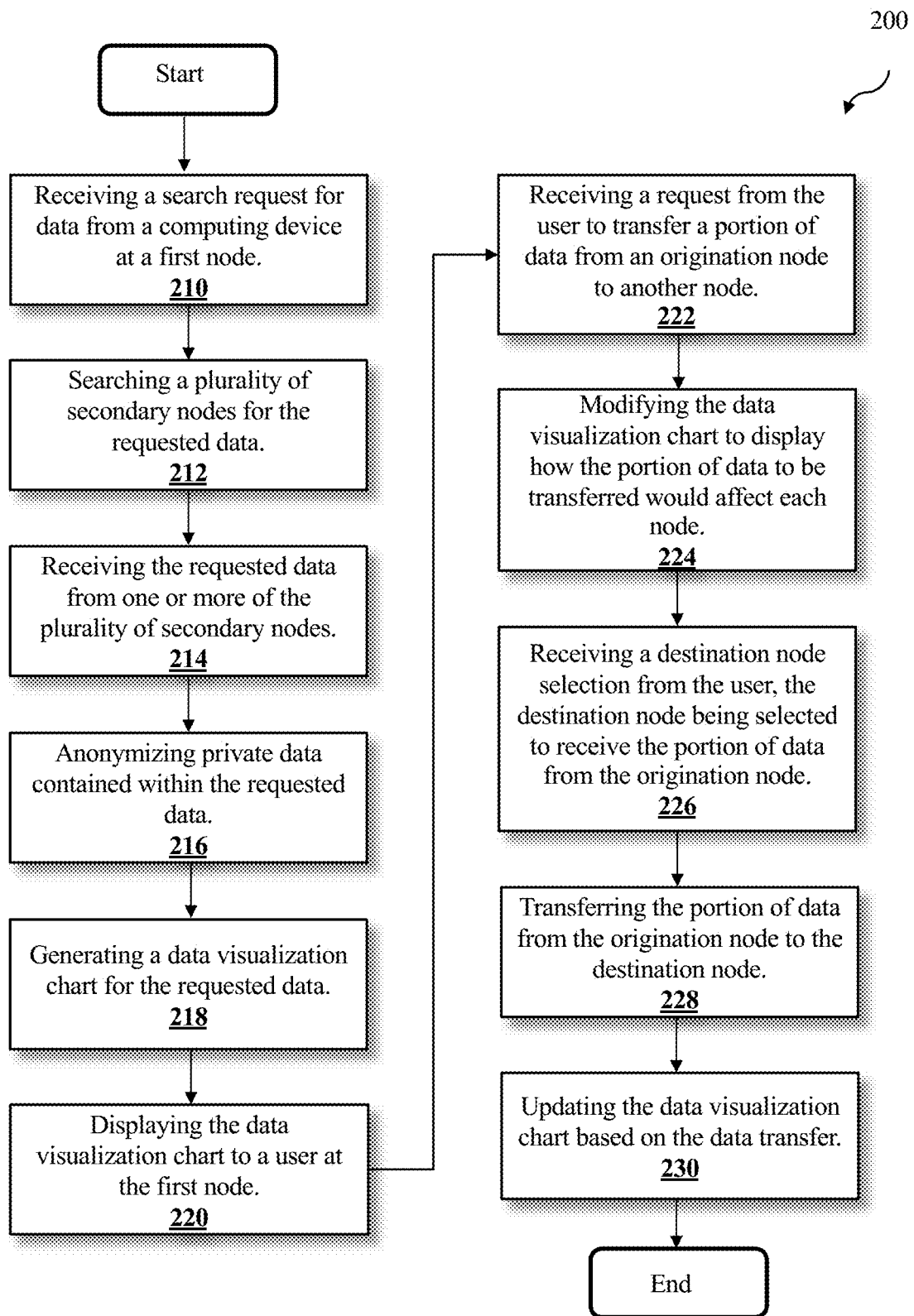
FIG. 2 is a flowchart illustrating an example method of the interactive data transfer in accordance with an embodiment of the invention.

Referring to FIG. 2, a method 200 for interactive data transfer is depicted, in accordance with an embodiment of the present invention.

Referring to block 210, the search module 150 receives a search request for data from a first node, i.e., the user device 110, via the user interface 112. Data search is described in more detail above with reference to the search module 150.

Referring to block 212, the search module 150 searches the plurality of secondary nodes, e.g. the server 120 and/or the secondary servers 130a, 130b, 130c for the requested data. Data search requests are described in more detail above with reference to the search module 150.

Referring to block 214, the data collection module 152 receives the requested data, e.g. the data 134a, 134b, 134c or a subset of the data 134a, 134b, 134c from the plurality of secondary nodes, e.g. the server 120 and/or the secondary servers 130a, 130b, 130c. Data collection is described in more detail above with reference to the data collection module 152.

Referring to block 216, the data collection module 152 anonymizes the requested data by either encrypting the private data contained within the requested data and/or by removing certain identifying information from the private data. Data anonymization is described in more detail above with reference to the data collection module 152.

Referring to block 218, the data visualization module 154 generates a data visualization chart 160 for the requested data. Data visualization is described in more detail above with reference to the data visualization module 154.

Referring to block 220, the data visualization module 154 displays the data visualization chart 160 on the first node, i.e. the user device 110, as part of the user interface 112. Data chart display is described in more detail above with reference to the data visualization module 154 and FIGS. 1c-1j.

Referring to block 222, the data transfer module 156 receives a request to transfer a portion of the requested data located from an origination node, e.g. secondary server 130a, to another node, e.g. secondary server 130b, 130c, and/or server 120. Data transfer requests are described in more detail above with reference to the data transfer module 156.

Referring to block 224, the data transfer module 156 modifies the data visualization chart 160 to display how the portion of data requested to be transferred from the origination node would affect each of the remaining nodes. Data chart modification is described in more detail above with reference to the data transfer module 156.

Referring to block 226, the data transfer module 156 receives a destination node selection to receive the portion of data from the origination node. Destination node selection is described in more detail above with reference to the data transfer module 156.

Referring to block 228, the data transfer module 156 transfers the portion of data from the origination node to the selected destination node. Data transfer is described in more detail above with reference to the data transfer module 156.

Referring to block 230, the data transfer module 156 updates the data visualization chart 160 to reflect the data transfer. Data chart update is described in more detail above with reference to the data transfer module 156.

Figure 3:
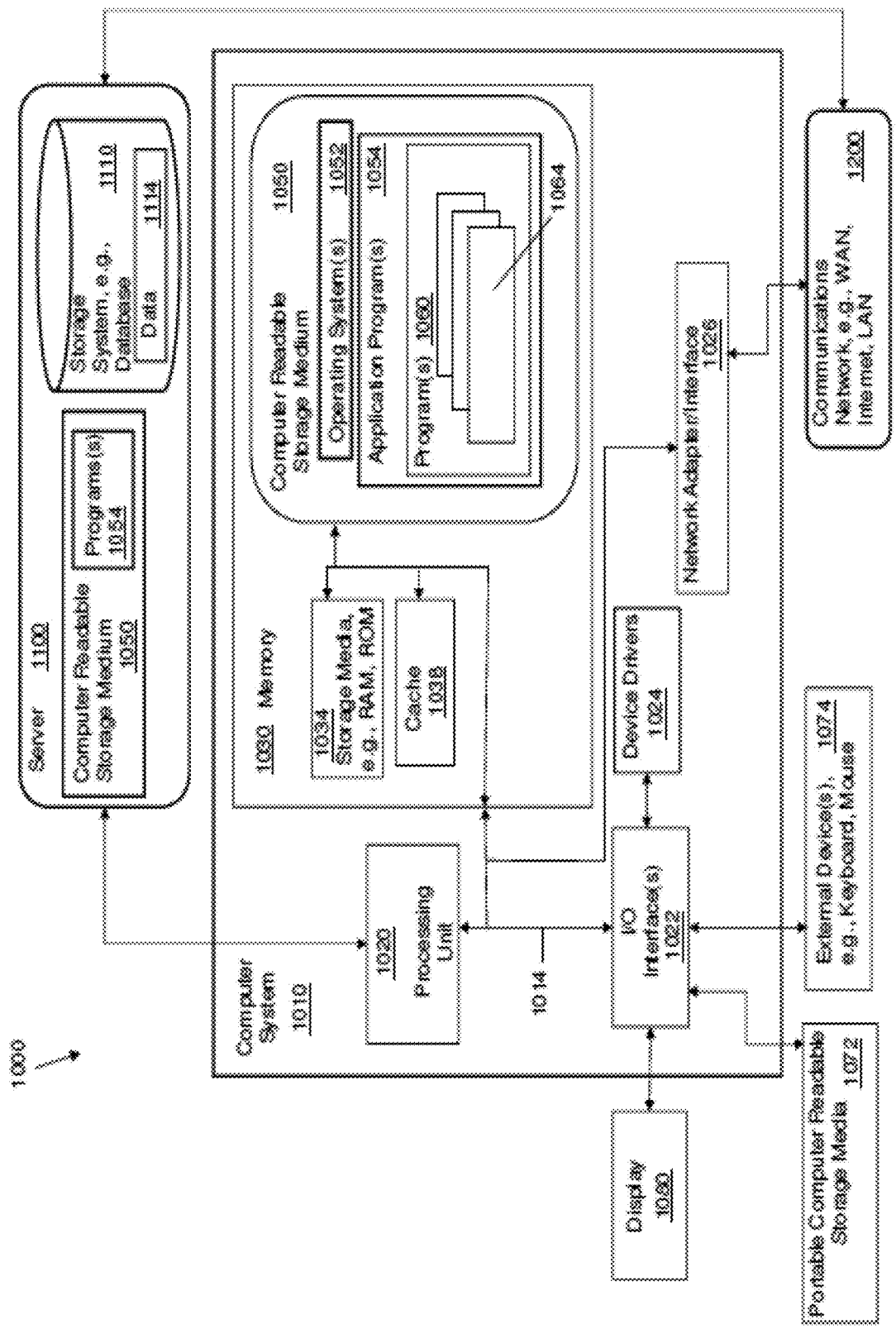
FIG. 3 is a block diagram depicting the hardware components of the interactive data transfer system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-156 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
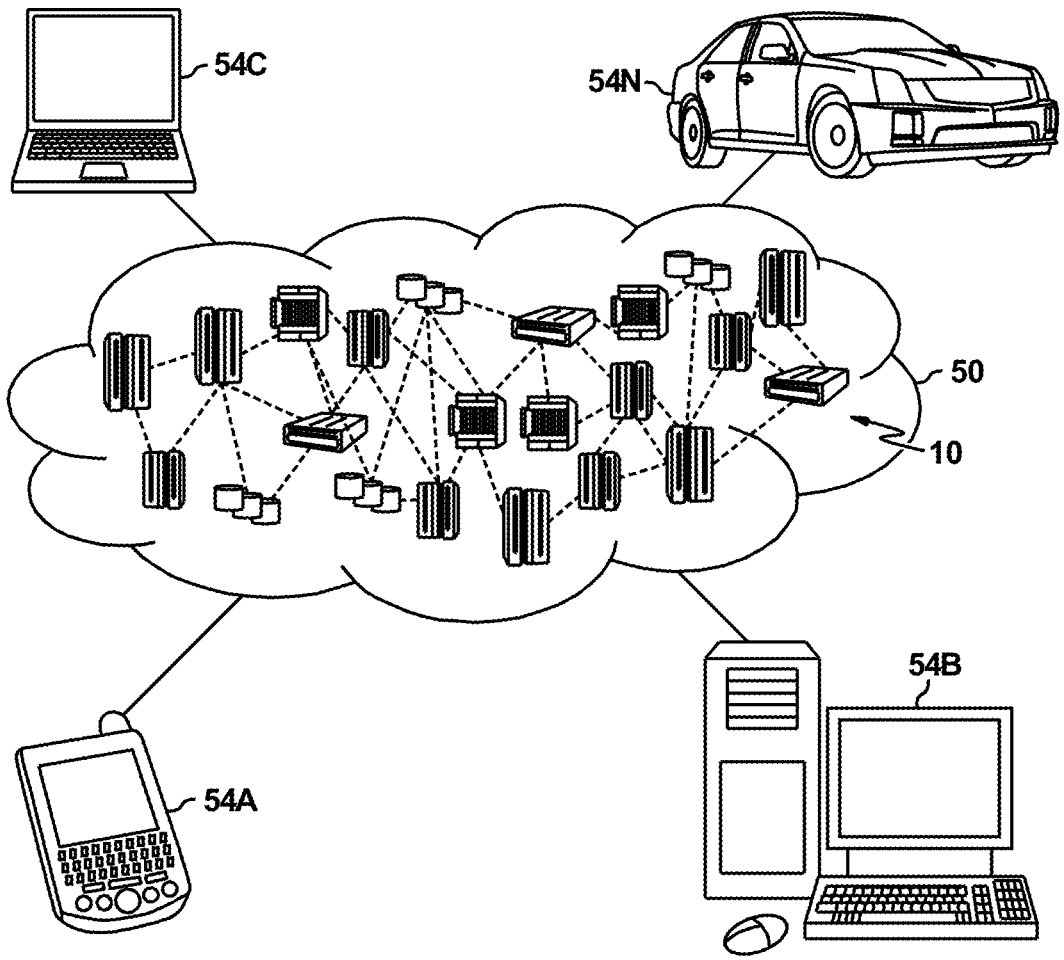
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
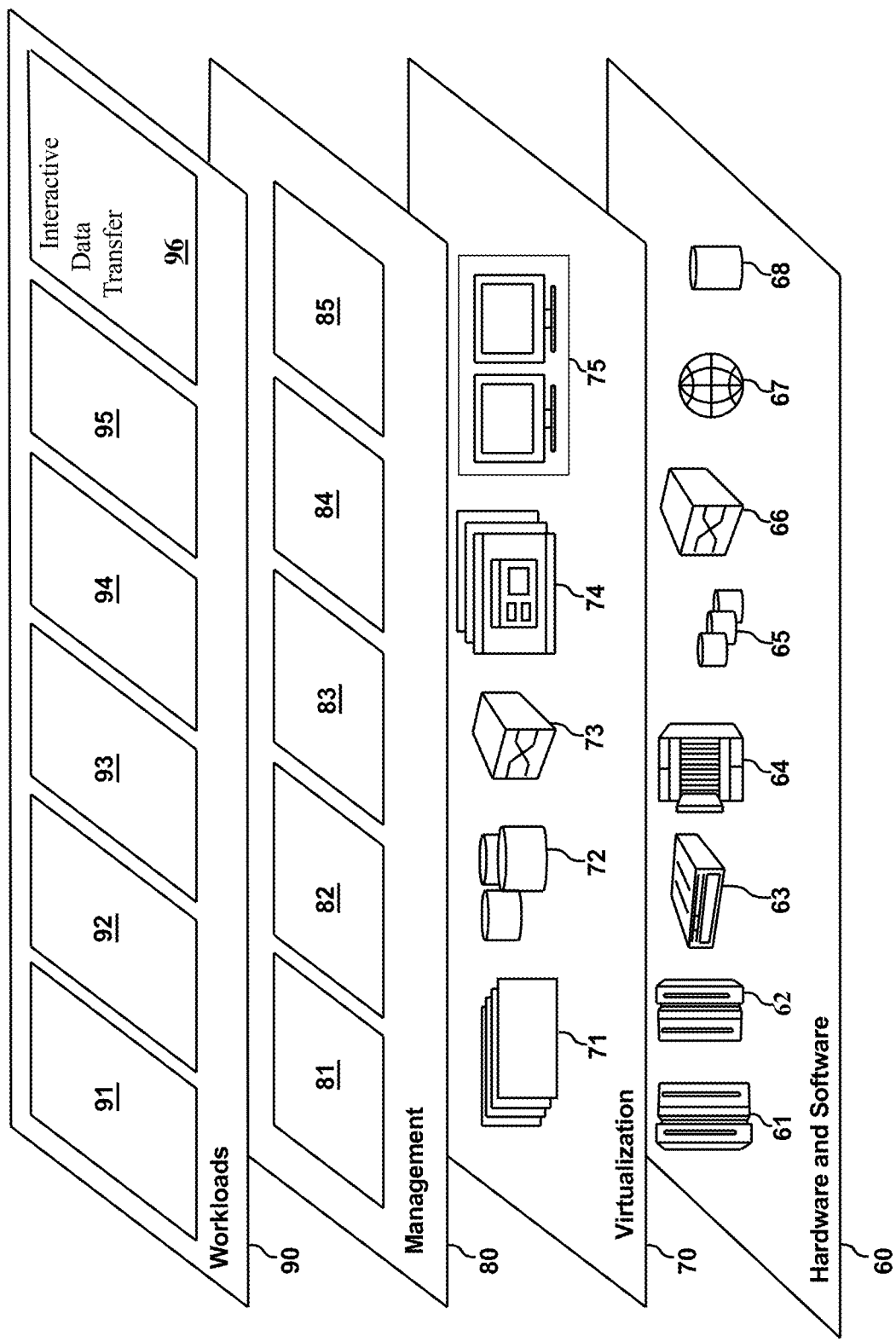
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interactive data transfer 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for interactive data transfer, the method comprising:
   receiving, by a computing device at a first node, a search request for a first set of electronic data;
   searching, by the computing device, a plurality of secondary nodes for the first set of electronic data;
   identifying, by the computing device, a first set of secondary nodes of the plurality of secondary nodes where the first set of electronic data is physically stored;
   generating, by the computing device, a data visualization chart based on a physical storage capacity for each of the plurality of secondary nodes, a physical available storage capacity for each of the plurality of secondary nodes, and the identified first set of secondary nodes of the plurality of secondary nodes on which the first set of electronic data is physically stored;
   displaying, by the computing device, the data visualization chart to a user at the first node, wherein the data visualization chart displays:
   the physical storage capacity for each of the plurality of secondary nodes,
   the physical available storage for each of the plurality of secondary nodes, and
   the identification of the first set of secondary nodes of the plurality of secondary nodes where the first set of data is physically stored;
   receiving, by the computing device, a request from the user to electronically transfer electronic data from a first origination node of the first set of secondary nodes of the plurality of secondary nodes;
   receiving, by the computing device, a request from the user to anonymize the first set of electronic data;
   anonymizing, by the computing device, the first set of electronic data by deleting private data of the first set of electronic data;
   copying, by the computing device, a first portion of the anonymized first set of electronic data from the origination node to a first destination node selected from the plurality of secondary nodes;
   copying, by the computing device, a second portion of the anonymized first set of electronic data from the origination node to a second destination node selected from the plurality of secondary nodes;
   deleting, by the computing device, the first set of electronic data from the origination node; and
   modifying, by the computing device, the data visualization chart to display how the portion of the first set of electronic data would affect each of the plurality of secondary nodes, wherein modifying the data visualization chart is performed in response to the received request from the user to transfer the portion of the first set of data and without physically transferring the portion of the first set of data.

2. The method according to claim 1, further comprising:
   receiving, by the computing device, a destination node selection of the plurality of secondary nodes from the user, the destination node of the plurality of secondary nodes being selected to receive the first portion of electronic data from the origination node;
   electronically transferring, by the computing device, the first portion of the first set of electronic data from the origination node to the destination node
   wherein the electronically transferring, by the computing device, the first portion of the first set of electronic data from the origination node to the destination node comprises clicking and dragging the first portion of the first set of electronic data from the origination node to the destination node using a user interface; and
   updating, by the computing device, the data visualization chart based on the data transfer.

3. The method according to claim 1, wherein the data visualization chart is a bar chart.

4. The method according to claim 1, wherein anonymizing, by the computing device, the first set of electronic data further comprises:
   encrypting remaining electronic data of the first set of electronic data.

5. A computer program product for interactive data transfer, the computer program product comprising:
   one or more computer readable storage medium and program instructions stored on the one or more computer readable storage medium, the program instructions executable by a computing system to cause the computing system to perform a method comprising:
   receiving, by a computing device at a first node, a search request for a first set of electronic data;
   searching, by the computing device, a plurality of secondary nodes for the first set of electronic data;
   identifying, by the computing device, a first set of secondary nodes of the plurality of secondary nodes where the first set of electronic data is physically stored;
   generating, by the computing device, a data visualization chart based on a physical storage capacity for each of the plurality of secondary nodes, a physical available storage capacity for each of the plurality of secondary nodes, and the identification of the first set of secondary nodes of the plurality of secondary nodes where the first set of electronic data is physically stored;
   displaying, by the computing device, the data visualization chart to a user at the first node, wherein the data visualization chart displays:
   the physical storage capacity for each of the plurality of secondary nodes,
   the physical storage capacity available for each of the plurality of secondary nodes, and
   the identification of the first set of secondary nodes of the plurality of secondary nodes where the first set of data is physically stored;
   receiving, by the computing device, a request from the user to electronically transfer electronic data from a first origination node of the first set of secondary nodes of the plurality of secondary nodes;

receiving, by the computing device, a request from the user to anonymize the first set of electronic data;

anonymizing, by the computing device, the first set of electronic data by deleting private data of the first set of electronic data;

copying, by the computing device, a first portion of the anonymized first set of electronic data from the origination node to a first destination node selected from the plurality of secondary nodes;

copying, by the computing device, a remaining portion of the anonymized first set of electronic data from the origination node to a second destination node selected from the plurality of secondary nodes, deleting, by the computing device, the first set of electronic data from the origination node; and modifying, by the computing device, the data visualization chart to display how the portion of the first set of electronic data would affect each of the plurality of secondary nodes, wherein modifying the data visualization chart is performed in response to the received request from the user to transfer the portion of the first set of data and without physically transferring the portion of the first set of data.

6. The computer program product according to claim 5, further comprising:

receiving, by the computing device, a destination node selection of the plurality of secondary nodes from the user, the destination node of the plurality of secondary nodes being selected to receive the first portion of electronic data from the origination node;

electronically transferring, by the computing device, the first portion of the first set of electronic data from the origination node to the destination node wherein the electronically transferring, by the computing device, the first portion of the first set of electronic data from the origination node to the destination node comprises clicking and dragging the first portion of the first set of electronic data from the origination node to the destination node using a user interface; and updating, by the computing device, the data visualization chart based on the data transfer.

7. The computer program product according to claim 5, wherein
the data visualization chart is a bar chart.

8. The computer program product according to claim 5, wherein anonymizing, by the computing device, the first set of electronic data further comprises:
encrypting remaining electronic data of the first set of electronic data.

9. A computer system for interactive data transfer, the computer system comprising: one or more computer processors, one or more computer readable storage medium, and program instructions stored on the one or more of the computer readable storage medium for execution by at least one of the one or more processors, wherein the computer system is capable of performing a method comprising:

receiving, by a computing device at a first node, a search request for a first set of electronic data;

searching, by the computing device, a plurality of secondary nodes for the first set of electronic data;

identifying, by the computing device, a first set of secondary nodes of the plurality of secondary nodes where the first set of electronic data is physically stored;

generating, by the computing device, a data visualization chart based on a physical storage capacity for each of the plurality of secondary nodes, a physical available storage capacity for each of the plurality of secondary nodes, and the identification of the first set of secondary nodes of the plurality of secondary nodes where the first set of electronic data is physically stored;

displaying, by the computing device, the data visualization chart to a user at the first node, wherein the data visualization chart displays:

the physical storage capacity for each of the plurality of secondary nodes, the physical storage capacity available for each of the plurality of secondary nodes, and the identification of the first set of secondary nodes of the plurality of secondary nodes where the first set of data is physically stored;

receiving, by the computing device, a request from the user to electronically transfer electronic data from a first origination node of the first set of secondary nodes of the plurality of secondary nodes;

receiving, by the computing device, a request from the user to anonymize the first set of electronic data;

anonymizing, by the computing device, the first set of electronic data by deleting private data of the first set of electronic data;

copying, by the computing device, a first portion of the anonymized first set of electronic data from the origination node to a first destination node selected from the plurality of secondary nodes;

copying, by the computing device, a remaining portion of the anonymized first set of electronic data from the origination node to a second destination node selected from the plurality of secondary nodes, deleting, by the computing device, the first set of electronic data from the origination node; and modifying, by the computing device, the data visualization chart to display how the portion of the first set of electronic data would affect each of the plurality of secondary nodes, wherein modifying the data visualization chart is performed in response to the received request from the user to transfer the portion of the first set of data and without physically transferring the portion of the first set of data.

10. The computer system according to claim 9, further comprising:

receiving, by the computing device, a destination node selection of the plurality of secondary nodes from the user, the destination node of the plurality of secondary nodes being selected to receive the first portion of electronic data from the origination node;

electronically transferring, by the computing device, the first portion of the first set of electronic data from the origination node to the destination node wherein the electronically transferring, by the computing device, the first portion of the first set of electronic data from the origination node to the destination node comprises clicking and dragging the first portion of the first set of electronic data from the origination node to the destination node using a user interface; and updating, by the computing device, the data visualization chart based on the data transfer.

11. The computer system according to claim 9, wherein the data visualization chart is a bar chart.

12. The computer system according to claim 9, wherein anonymizing, by the computing device, the first set of electronic data further comprises:
encrypting remaining electronic data of the first set of electronic data.

* * * * *